(12) United States Patent
Rumeau et al.

(10) Patent No.: US 9,624,609 B2
(45) Date of Patent: Apr. 18, 2017

(54) COMPOSITE MATERIALS

(75) Inventors: Nicolas Rumeau, Saint Medard en Jalles (FR); Aurélie Buisson, Saint Medard en Jalles (FR); Pascal Trouillot, Saint Medard en Jalles (FR)

(73) Assignee: Roxel France, Saint-Medard-en-Jalles (FR)

( * ) Notice: Subject to any disclaimer, the term of this patent is extended or adjusted under 35 U.S.C. 154(b) by 737 days.

(21) Appl. No.: 13/985,276

(22) PCT Filed: Feb. 15, 2011

(86) PCT No.: PCT/EP2011/052210
§ 371 (c)(1),
(2), (4) Date: Mar. 31, 2014

(87) PCT Pub. No.: WO2011/101343
PCT Pub. Date: Aug. 25, 2011

(65) Prior Publication Data
US 2014/0220841 A1  Aug. 7, 2014

(51) Int. Cl.
| D04H 1/10 | (2006.01) |
| D04H 1/14 | (2006.01) |
| C08J 5/04 | (2006.01) |
| C08J 5/24 | (2006.01) |
| C08J 9/00 | (2006.01) |
| C08J 9/14 | (2006.01) |

(Continued)

(52) U.S. Cl.
CPC ............... *D04H 1/14* (2013.01); *C08J 5/044* (2013.01); *C08J 5/045* (2013.01); *C08J 5/048* (2013.01); *C08J 5/24* (2013.01); *C08J 9/0061* (2013.01); *C08J 9/0085* (2013.01); *C08J 9/141* (2013.01); *C08J 9/32* (2013.01); *D04H 1/64* (2013.01); *D06M 23/12* (2013.01); *C08J 2201/024* (2013.01); *C08J 2497/00* (2013.01); *Y10T 442/2525* (2015.04); *Y10T 442/2959* (2015.04); *Y10T 442/2975* (2015.04)

(58) Field of Classification Search
CPC .. C08J 2201/024; C08J 2497/00; C08J 5/044; C08J 5/045; C08J 5/048; C08J 5/24; C08J 9/0061; C08J 9/0085; C08J 9/141; C08J 9/32; D04H 1/10; D04H 1/14; D04H 1/64; D06M 23/12; Y10T 442/2525; Y10T 442/2959; Y10T 442/2975
USPC ....... 442/402, 403, 405, 374, 370, 320, 321, 442/322, 123, 178, 176; 264/137
See application file for complete search history.

(56) References Cited

U.S. PATENT DOCUMENTS 4,410,481 A  10/1983  Mayerhoffer
4,432,825 A   2/1984  Andersson et al.
(Continued)

FOREIGN PATENT DOCUMENTS

CN  101092472 A  12/2007
CN  101284899 A  10/2008
(Continued)

*Primary Examiner* — Arti Singh-Pandey
(74) *Attorney, Agent, or Firm* — Baker Hostetler LLP

(57) ABSTRACT

Novel composite materials are provided consisting of a substrate based on fibers of natural, mineral or vegetable origin, and of a mixture formed from a matrix of water-based resin and an expanding agent. The nature and the proportions of the various elements constituting these novel composite materials is also provided. A method of manufacture for making these novel composite materials starting from the constituent elements and the characteristics of the different steps of said method is also provided.

12 Claims, 6 Drawing Sheets

(51) Int. Cl.
  *C08J 9/32* (2006.01)
  *D04H 1/64* (2012.01)
  *D06M 23/12* (2006.01)

(56) References Cited

U.S. PATENT DOCUMENTS

| | | |
|---|---|---|
| 2004/0115455 A1 | 6/2004 | Quist et al. |
| 2004/0198926 A1 | 10/2004 | Swedo et al. |
| 2010/0204351 A1 | 8/2010 | Swedo et al. |

FOREIGN PATENT DOCUMENTS

| | | |
|---|---|---|
| CN | 101412796 A | 4/2009 |
| CN | 101519572 A | 9/2009 |
| CN | 101857787 A | 10/2010 |
| DE | 4207243 A1 | 9/1993 |
| DE | 20104584 U1 | 7/2002 |
| EP | 0041054 A2 | 12/1981 |
| EP | 0102335 A1 | 3/1984 |
| GB | 1069625 A1 | 5/1967 |
| JP | S57-103214 A | 6/1982 |
| JP | H02-9933 B2 | 3/1990 |
| JP | H11-60780 A | 3/1999 |
| JP | 2004-521975 A | 7/2004 |
| JP | 2007-217517 A | 8/2007 |
| JP | 2007-533819 A | 11/2007 |
| JP | 2007-533820 A | 11/2007 |
| JP | 2010-540752 A | 12/2010 |

COMPOSITE MATERIALS

CROSS-REFERENCE TO RELATED APPLICATIONS

This application is a National Stage of International patent application PCT/EP2011/052210, filed on Feb. 15, 2011, the disclosure of which is incorporated by reference in its entirety.

FIELD OF THE INVENTION

The present invention relates to the field of composite materials based on fibrous materials and resins. It relates more particularly to the field of composite materials made from natural fibrous materials and aqueous resins.

BACKGROUND

Nowadays composite materials are commonly used for more or less specialized applications. These composite materials are generally manufactured, in a known manner, starting from a woven or nonwoven, organic or inorganic absorbent material, impregnated with a thermosetting resin. Application EP 0041054 notably describes the formation of such materials. Certain composite materials are constituted in particular of glass fibers, mineral fibers, cellulose or polyester fibers, impregnated with thermosetting resins based on urea-formaldehyde, phenol-formaldehyde, resorcinol-formaldehyde or melamine-formaldehyde combinations.

In general, preparation of these materials comprises impregnating the fibers of absorbent material with a solution of resin, a phenol-formaldehyde resin for example, in which microspheres consisting of a polymer material, of the vinylidene chloride/acrylonitrile type, containing an expanding agent of the isobutane type for example, are dispersed.

In particular, the example in the text of European patent application EP 01 02 335 notably describes a method for producing a composite material using cellulose fibers, said method comprising mixing microspheres with a suspension of cellulose fibers. After dewatering, the fibrous network is calendered and heated to 120° C. to initiate expansion. The expanded material is impregnated with an aqueous solution of phenolic resin, then dried by microwave and then the resin is crosslinked.

The method described in this application offers the advantage that the composite material can be produced in two steps, which can, to a certain extent, be spread over time. Conversely, it requires two baking phases, the first for causing the microspheres to react, which act as expanding agent and initiate expansion of the material, and the second for crosslinking the resin and imparting rigidity to the material. Therefore there is some complexity in application of this method.

It is therefore desirable to have an alternative, simpler method, by which a composite material, notably a composite material based on natural fibers, can be produced more easily.

SUMMARY OF THE INVENTION

For this purpose, the invention relates to a composite material consisting of:

a substrate of natural fiber having the structure of a felt, said felt being needle-punched on its two faces by supplying an additional polyethylene fiber;

a thermosetting matrix formed from a water-based resin configured for impregnating the substrate completely;

an expanding agent dispersed in the matrix, expansion of which is initiated (caused) by heating it to a given temperature, the expanding agent forming, with the thermosetting matrix, an aqueous mixture integrated with the substrate by impregnation.

According to the invention, the proportions by weight of substrate and of thermosetting matrix used are defined so as to obtain an impregnated substrate having the following proportions by weight after drying:

between 60% and 80% of fibers, between 40% and 20% of resin.

Moreover, the proportion by weight of expanding agent in the aqueous mixture is between 10% and 15%.

According to a preferred embodiment of the material according to the invention, the substrate is a felt of basalt fibers.

According to a preferred variant of this embodiment, the basalt constituting the fibers forming the substrate contains a proportion of olivine at least equal to 15 wt %.

According to a preferred embodiment, the resin constituting the matrix is a phenol-formaldehyde resin.

According to an alternative embodiment, the resin constituting the matrix is obtained from a bio-source.

According to a preferred embodiment, the expanding agent is formed from microspheres of hydrocarbons coated with a polymer film.

According to a preferred variant of this embodiment, the hydrocarbon of the expanding agent is isobutane.

According to a preferred embodiment, the expanding agent is a yeast mixed in the water-based resin.

According to a preferred embodiment, the material according to the invention comprises a substrate of fiber and a thermosetting matrix (aqueous base) in the following proportions by weight:

fibers: 30% matrix: 70%

According to an embodiment that is an alternative to the preceding embodiment, the material according to the invention comprises a substrate of fiber and a thermosetting matrix (aqueous base) in the following proportions by weight:

fibers: 40% matrix: 60%

According to a preferred embodiment, the material according to the invention further comprises an antibacterial agent immersed in the matrix.

According to a preferred embodiment, the material according to the invention further comprises at least one colorant immersed in the matrix.

The invention also relates to a method for manufacturing the composite material according to the invention, said method mainly comprising the following steps:

a first step of impregnation of the fibrous substrate with aqueous mixture, impregnation being carried out by gravity spraying on at least one face of the substrate and calendering, a second step of dewatering of the impregnated substrate, the dewatering being carried out by stoving of the impregnated substrate and forced ventilation, the stoving being carried out according to cycles alternating exposure of the impregnated substrate to a positive temperature above 20° C. and to a negative temperature below −5° C., a third step of activation of the expanding agent, expansion being activated by raising the temperature of the impregnated and dewatered substrate, with volume constraint being imposed on the substrate, a fourth step of removing the volatile matter trapped in the material produced, removal being effected by applying, at the start and/or at the end of expansion, a phase of surface decompression of the material produced.

According to a preferred embodiment, the second dewatering step consists of putting the impregnated substrate in a climate chamber and subjecting it to alternating cycles of holding at a temperature set between 25° C. and 28° C. and then holding at a temperature set roughly equal to −10° C.

According to a variant embodiment, the steps of expansion and of decompression are carried out with a time delay, the impregnated and dewatered substrate being stored in packing suitable for keeping its moisture level constant.

According to a variant embodiment, the method according to the invention is completed by a final step of stabilization, during which the manufactured material is kept horizontal at room temperature until its temperature returns to room temperature naturally.

According to a preferred embodiment, the third step of expansion is carried out by passing the material through a heating press for applying a counter-pressure limiting the expansion caused by the heating, and comprises the following operations:

preheating the press, placing, between the two platens of the press, equipment for controlling the thickness as well as the geometry of the element of composite material to be produced;

putting a mold release agent on the bottom platen of the press, as well as on the upper face of the impregnated substrate;

applying pressure to the press, the value of the pressure applied depending on the thickness that the element is to have after expansion.

According to a variant embodiment, the mold release agent used in the third step is parchment paper.

According to a variant embodiment, the value of the pressure applied by the press is a value previously recorded in the operating and control system of the press.

According to a preferred embodiment, the value of the pressure applied by the press is between 75 and 200 tonnes.

According to a particular embodiment of the method according to the invention, the element of material produced is obtained by molding the impregnated substrate, the latter being introduced into the press in its mold, the pressure applied by the press being transmitted to the substrate by transfer of the pressure applied on its upper and lower parts of the mold.

Owing to its intrinsic characteristics, the material according to the invention can advantageously be used for making elements for thermal insulation and fire protection, especially in the aeronautical field, where making savings on the on-board weight is a constant preoccupation. The material according to the invention can thus advantageously be used for making:

inspection hatches mounted on the structure of aircraft or helicopters and making it possible to inspect the interior of certain parts of said structure, internal partitions intended for organizing the interior of vehicles, notably of aircraft (cabin and cockpit), staples (elements for fixing to the floor and to the ceiling) intended for holding said partitions in position or elements of furniture intended for equipping these same vehicles, thermal protection coatings of covers, notably of covers allowing access to shafts of engines of aircraft or helicopters, elements for thermal protection of engine pods, packaging for protection and transport of objects that are sensitive to thermal stresses, core materials for noise insulation, soundproofing, thermal insulation and mechanical isolation.

BRIEF DESCRIPTION OF THE DRAWINGS

The features and advantages of the invention will be better understood from the description given below, which is based on the appended figures, showing.

DETAILED DESCRIPTION

Figure 1:
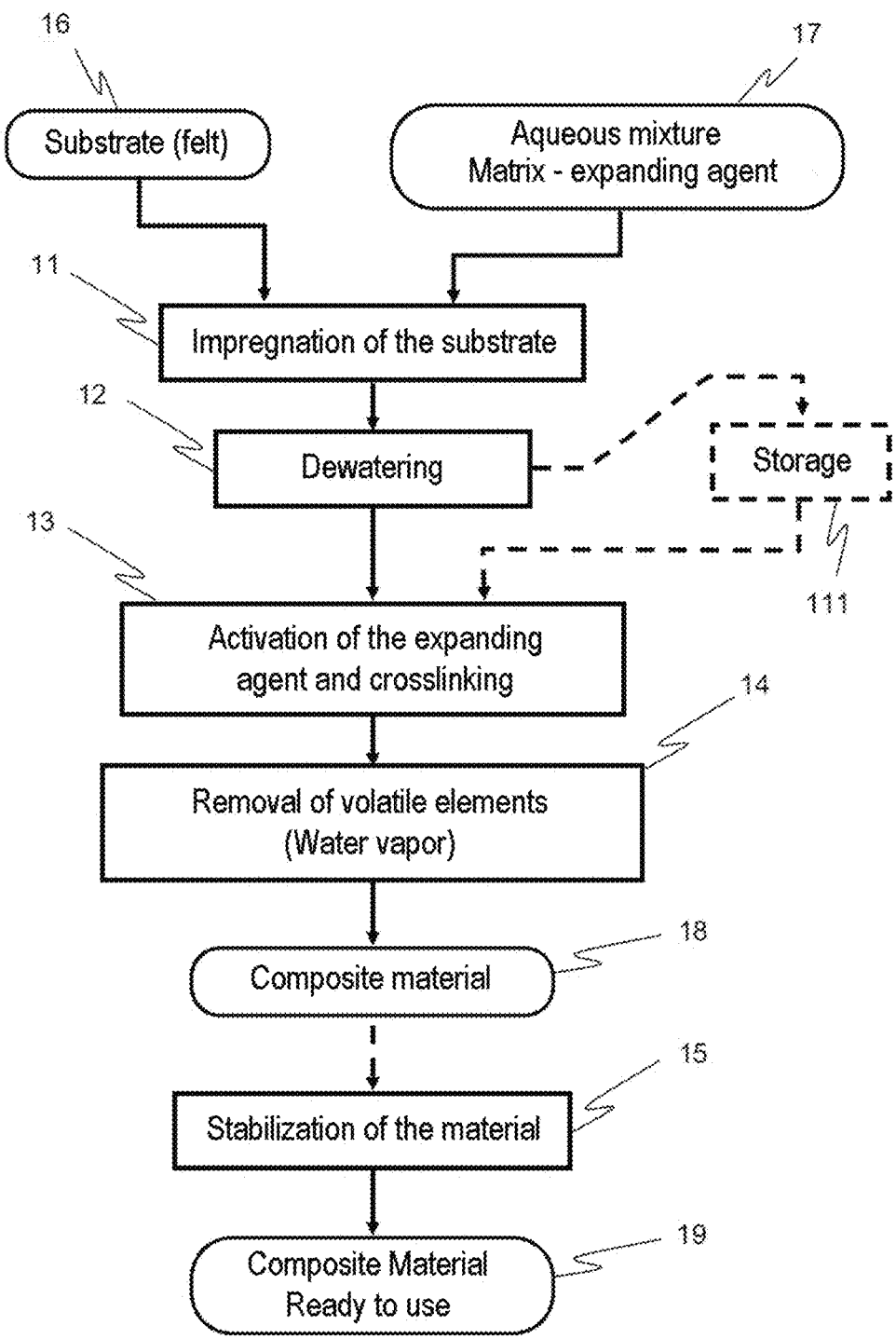
FIG. 1, basic flowchart of the sequence of steps of the method for manufacturing the composite material according to the invention.

According to a first object, the present invention therefore relates to a new type of composite material comprising a support, a substrate, formed from fibers of natural origin, impregnated with a mixture formed from one or more thermosetting resins and an expanding agent.

According to the invention, the fibers of natural origin are mineral or vegetable fibers in the form of felt, fibers of basalt, of flax, of hemp, of maize, of sunflower, or of bamboo in particular. The natural fibers usable according to the invention can originate up to a level of 30% from recyclable materials.

Felt is to be understood as a nonwoven manufactured sheet, consisting of films or of layers of fibers oriented in a particular direction or at random. Said felt can be in all forms endowing it with sufficient porosity to be impregnated.

The use of natural fibers in the form of felt advantageously allows volume expansion of the fibers (i.e. in the three dimensions). The fibers can thus be distributed uniformly through the thickness of the substrate, thus ensuring homogeneity of the final product. This volume expansion contributes, moreover, to the mechanical strength as well as to the noise insulation, soundproofing and thermal performance of the composite material formed. Using a felt also means that only one baking phase is required, in contrast to EP 0102335, thus limiting the energy consumption.

It should be noted that the fibers of natural origin used for manufacturing felts are generally obtained by defibering, which makes their moisture level completely random. This very variable water content means that their use is specific, relative to the fibers usually employed for making composite materials, such as glass fibers. In fact, the presence of water strongly impacts the reproducibility of the final product if the methods of manufacture used do not take into account the variability of the moisture content of the fibers. The use of fibers of natural origin consequently requires removal of the water vapor, which is not the case with the glass or cellulose fibers usually employed in composite materials. Thus, the methods described in EP 0 041 054 and EP0102335 cannot be applied as such to natural fibers.

As already mentioned, the fibers of the substrate, used for making the composite material according to the invention, are fibers of natural origin, among which we may notably mention basalt, flax, hemp, sunflower, bamboo or maize. However, in the case when the desired final product is characterized by excellent heat resistance as well as resistance to high levels of mechanical stress, the fibers used are preferably basalt fibers. In fact, fibers of vegetable origin whose degradation under the action of a heat flux occurs at lower temperature are not suitable as a constituent of a final material intended to be subjected to environments with high thermal stress.

According to a preferred embodiment of a material according to the invention suitable for environments with high thermal stress, basalt fibers of Ukrainian origin are used, or by default of Russian origin, which are characterized in particular by a relatively high level of olivine, typically above 15% (percentage by weight). This level of olivine advantageously makes it possible to obtain good uniformity of the diameter of the fibers obtained by spinning and endows these fibers with advantageous performance with respect to mechanical strength and heat resistance.

Thus, the basalt fiber used preferably has the characteristics presented in Table 1 below.

TABLE 1

Characteristics of the basalt fibers

| Characteristics | Values | Units |
| --- | --- | --- |
| Average diameter | 13 | μm |
| Olivine level | 15-25 | % |
| Melting point | 1350 | ° C. |
| Breaking stress | 1500-2000 | MPa |
| Elastic modulus | 82-110 | GPa |
| Elongation at break | 5-7 | % |
| Density | 2.7 | g/cm$^3$ |

In a preferred embodiment of a composite material according to the invention, the felts used are those offered by the company Basaltex and more particularly grades 4/120 and 6/130 of the range BCF Fibers Needlefelts/Mats associated with weights of 480 and 780 g/m$^2$ respectively.

According to the invention, the felts used are preferably needle-punched on both faces, moreover by known techniques, in order to ensure integrity of the felt during the production cycle of the expanded composite material. Needling is preferably carried out by supplying an additional polyethylene fiber.

Moreover, it should be noted that for obvious reasons of controlling the process of impregnation of the felt (optimized wetting of the fibers in the three spatial directions) with the resin, all previous surface treatment of the fiber, such as oiling, is prohibited.

According to the invention, the resins used for making the composite material are preferably water-based resins such as resins of the phenolic type and notably phenol-formaldehyde resins. Advantageously, these resins offer particularly good performance for endowing the final composite material with excellent heat resistance. In fact, when they are exposed to heat, a very endothermic phenomenon of chemical transformation produces a protective carbon-containing layer on their surface, which acts as an obstacle to transfer of this heat. Moreover, as they are consumed, these resins do not produce toxic fumes, which allows them to be used for the interior equipment of cabins intended for equipping vehicles for carrying passengers.

Alternatively, the resins used can be water-based natural resins obtained from bio-sources, such as wood resins or phenolic resins of vegetable origin (grape tannins).

According to the invention, the viscosity of the resin used is suitable for the density of the felt used for making the material, so as to impregnate said felt uniformly through the thickness. The use of a resin whose viscosity is unsuitable will lead to formation of a final product that is inhomogeneous or has a ratio of the percentage by weight of resin to the percentage by weight of fibers that is far from the values that endow the final product with the required mechanical, thermal and acoustic characteristics.

Thus, it may be noted, as a guide, that a resin with a viscosity of 300 mPa·s provides uniform impregnation of a basalt felt with a density of 780 g/m$^2$.

It should be noted that it is possible, if necessary, to add water to it in order to adjust its viscosity level.

According to the invention, the expanding agent can be selected from the expanding agents usually employed for this type of application. In a preferred embodiment of the invention the expanding agent preferably consists of microspheres of the Expancel® type marketed by the company Akzo Nobel. The expanding agent can also be of the isobutane type or else can be selected from natural yeasts or chemical raising agents.

Generally, the composite material according to the invention comprises by weight between 20% and 60% of fibers of natural origin and between 40% and 80% of resin+expanded agent mixture.

The expanding agent is generally between 5 wt % and 25 wt % of the final composite material.

From the standpoint of the composition by weight, the composite material according to the invention comprises roughly 30 wt % of natural fibers in the form of felt and 70 wt % of a mixture consisting of resin and expanding agent. The mixture of resin and expanding agent for its part roughly consists of 80% of resin and 20% of expanding agent.

Thus, observing these proportions, and using the method of manufacture described hereunder, a composite material is produced which, in comparison with the manufactured materials (wood, plastics, laminates, honeycombs, aluminum strip, etc.) commonly used in the proposed applications (cabin accommodation of aircraft, thermal boxes and partitions, inspection hatches for aircraft, etc.), advantageously has the following characteristics:

good uniformity of fibers, giving consistent expansion in the 3 axes. This uniformity is defined by a (random) distribution of almost constant concentration of fibers in the three dimensions of the material;

a variable density, adjustable in manufacture between 20 kg/m³ and 1500 kg/m³. Adaptation of the density to the intended application thus allows savings to be made on the on-board weights;

a variable thickness, adjustable in manufacture between 2 mm and 150 mm;

mechanical characteristics complying with standards NF EN ISO 844 (crushing resistance) and NF EN ISO 179-1 (Charpy impact strength): the material can be envisaged as a structural element, notably in certain applications of interior equipment of cabins of vehicles for passenger transport, the strength characteristics and appearance of the material obtained being for example suitable for making its use attractive for making cabin furniture for civil aircraft;

thermal and acoustic characteristics that make it suitable for use as thermal and acoustic insulation material for any type of application requiring excellent capacities of thermal attenuation (including fire protection applications) and/or acoustic attenuation. The composite materials according to the invention notably can be used for making structures that meet the current fire/smoke specifications in various fields of activity such as notably air transport, in particular standard ISO 2685 (1998 Edition) or standard FAA AC 20-135, or even fireproof structures in the sense of the latter standard, their fire resistance being a function of the thickness and density of the material used;

ease of removal associated with the use of natural fibers, of basalt fibers in particular, which owing to the intrinsic physical characteristics (minimum diameter of the spun fiber, cracking almost impossible on the length of the fiber) do not constitute a danger to the health of the user of the material (fiber diameter above the limit of "respirability") and consequently to that of the persons charged with the operations of dismantling, at end of life, objects manufactured from the composite material according to the invention.

Moreover, the composite material according to the invention does not impair the transmission of radio waves and can thus be used in applications for protection of transmitters and receivers, in radar equipment for example.

Conversely, a composite material manufactured with proportions of ingredients outside the specified ranges is characterized by different properties.

For example, a material whose proportion by weight of fibers is below 20% will no longer possess adequate mechanical characteristics to envisage its application as structural material even for applications not requiring high levels of mechanical strength.

Moreover, a material whose proportion by weight of fibers is above 40% will not have characteristics of sufficient density (after expansion), which will consequently degrade the material's capacity to resist crushing.

In particular embodiments, the composite material according to the invention can comprise ingredients additional to those described above, with the aim of endowing it with additional properties such as resistance to contaminating chemicals or an increase or a decrease in its electrical resistivity, or even an aesthetic character. These ingredients can notably be added to the aqueous mixture of resin and expanding agent, especially when they are, for example, antibacterial agents (of the lauryl-dimethyl-benzylammonium chloride type) or organometallic pigments (colorants) dispersed in the aqueous phase.

The composite material according to the invention can also comprise other materials and additives generally used for the applications envisaged: mold release agents, and fireproofing products notably for fibers of vegetable origin.

It should be noted that the composite material manufactured according to the invention can have a very variable density, as was mentioned above. Thus, for a given weight of ingredients, the density will be inversely proportional to the thickness of the final product. Therefore, bearing in mind that the thickness of the material manufactured according to the invention can have a thickness between 2 mm and 150 mm, the density of the material can vary in a ratio of 75 and thus can be between 20 kg/m³ and 1500 kg/m³.

It should also be noted that, in the context of the present invention, the density of the boards of material produced can also be adjusted by varying the proportion of expanding agent introduced into the mixture. Ideally, this proportion of expanding agent is fixed nominally at 15% (in percentage by weight of the aqueous solution) for components of large thicknesses and can be reduced to 12% for components of medium thicknesses.

The composite material according to the invention, as described in the foregoing, is made using the original method described hereunder and summarized by the flowchart of FIG. 1. According to the invention, the method of manufacture employed comprises the following steps:

a first step 11 of impregnation of the felt of fibers constituting the substrate with the water-based mixture of thermosetting resin and expanding agent, a second step 12 of dewatering of the impregnated substrate, a third step 13 of expansion of the impregnated and dewatered substrate, a fourth step 14 of removal of the water vapor contained in the composite material formed.

According to the invention, these four manufacturing steps are preferably followed by a final step 15 of stabilization of the material produced, obtained at the end of the four manufacturing steps.

Figure 2:
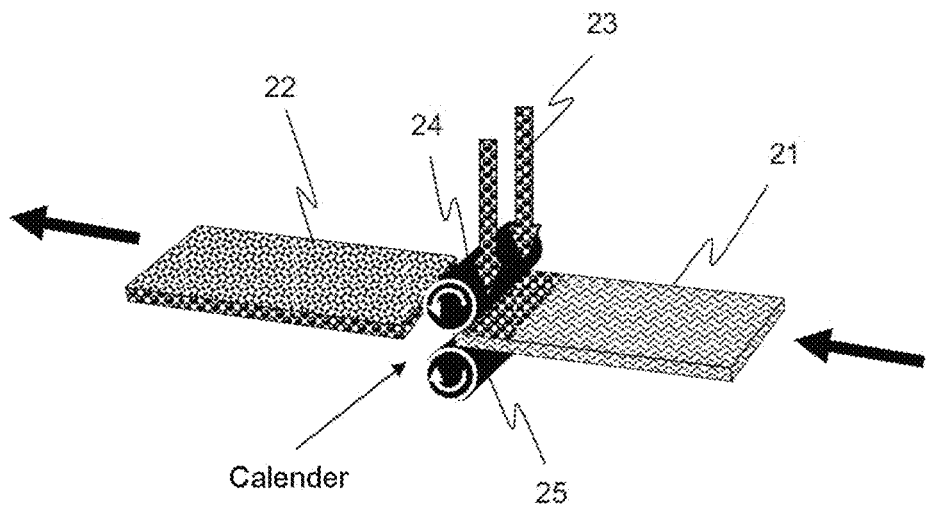
FIG. 2, illustration of a preferred embodiment of the impregnation step of the method according to the invention.

As shown in FIG. 2, step 11 of impregnation of the fibers constituting the substrate 21 can be carried out by gravity by pouring the mixture of resin and expanding agent onto the substrate, as indicated by the arrows 23, or by immersion (not shown) in a bath of the mixture of resin and expanding agent in the aqueous phase. It comprises a calendering operation. The proportion by weight of resin within the felt, or degree of impregnation, is in this case a function of the flow rate of the resin/expanding agent mixture, of the distance between centers of the rollers 24 and 25 of the calender as well as of the feed speed of the felt. Ideally, impregnation is carried out using a feed rate of the fibrous reinforcement of 2 meters per minute. Two successive impregnation passes (on both sides) can be carried out when using felt of high density in order to promote impregnation to the center of the fibrous reinforcement.

Alternatively, impregnation of the fibrous felt can also be carried out by the RTM (Resin Transfer Molding) process, which allows production of monolithic components with complex geometries and functionalized (device integration or measurement sensors for example), thus limiting the mechanical assembly operations in the proposed fields of application.

At the end of the impregnation step, a substrate 22 is obtained, impregnated with resin/expanding agent mixture, which has roughly the following proportions by weight:

70% of resin/expanding agent mixture,

30% of fibrous reinforcements.

The second step 12 of dewatering of the impregnated substrate 22 consists, before the expansion step 13, of bringing the water content of the impregnated substrate 22 to a value ideally between 10% and 13% by weight, knowing that, generally, a moisture level between 8% and 15% after dewatering is suitable for application of the next steps of the method according to the invention, the moisture level of the impregnated substrate 22 at the end of the dewatering step depending on its thickness.

According to the invention, step 12 of dewatering of the impregnated substrate can be carried out by simple evaporation with air renewal or evaporation/condensation in a confined environment so as not to destroy the structure of the fibers.

Figure 3:
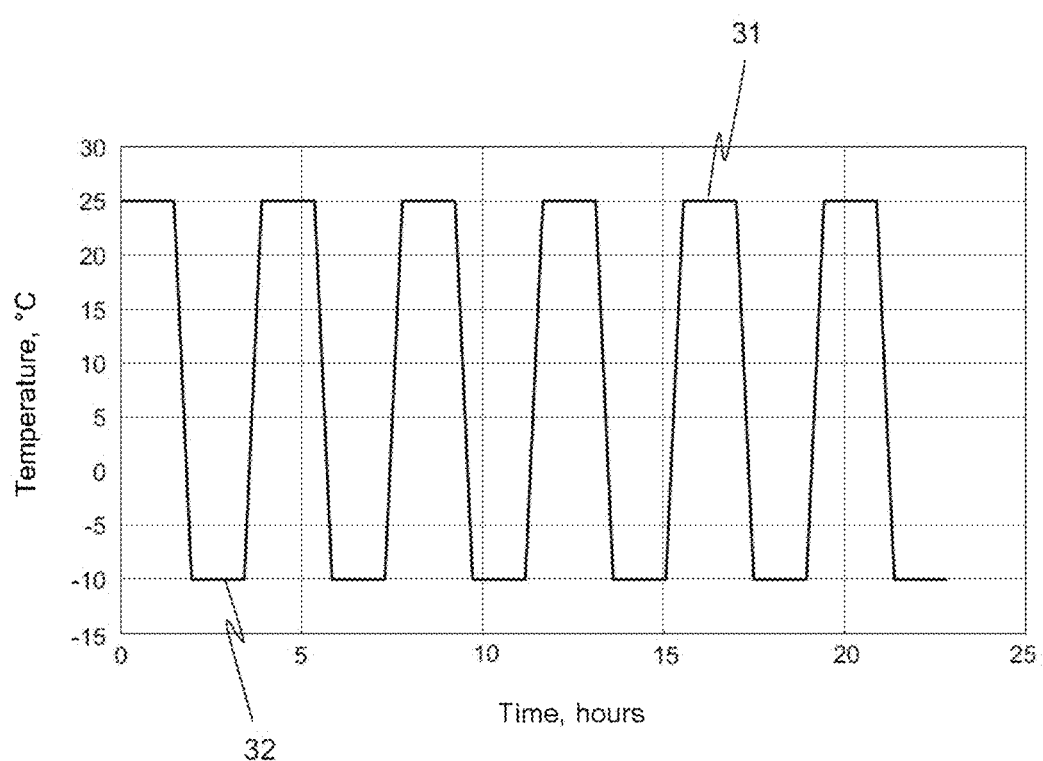
FIG. 3, a basic timing diagram of the alternation of the cycles of stoving employed in the context of a preferred embodiment of the dewatering step of the method according to the invention.

However, in a preferred embodiment of this dewatering step 12, the impregnated substrate 22, previously placed on a porous support, a metal grille for example, is held for a time roughly equal to 24 hours within a climate chamber comprising an internal ventilation system, in which it is submitted, as shown in FIG. 3, to a succession of cycles of heating 31 and of cooling 32, the temperature to which the material is cooled or heated preferably varying between −10° C. and +25° C.

At the end of the dewatering step 12, the impregnated substrate thus has a controlled water content which makes it possible to carry out the next steps 13 and 14 of expansion and of removal of the water vapor. Therefore, it is then possible to proceed immediately to the next steps 13 and 14 and complete the manufacture of the material. Alternatively, it is possible to defer completion of manufacture and defer application of the third and fourth steps, proceeding to storage 111 of the impregnated and dewatered substrate. The latter must then, however, be packaged in such a way that the moisture level obtained is conserved.

It should be noted that, generally, it is preferable to dewater the impregnated substrate in the form desired for the final material. In this case the impregnated substrate is dewatered while it is mounted on the template corresponding to this form, the whole being placed in the climate chamber mentioned above.

The third step 13 of the process for manufacturing a composite material according to the invention relates to expansion of the dewatered, impregnated substrate 22. It is preferably carried out with heating equipment, by raising the temperature of the substrate to a temperature greater than or equal to the temperature of expansion of the expanding agent, for example to a temperature generally between 75° C. and 180° C., preferably between 90° and 130° C. As an alternative, it can be carried out by exposing the impregnated and dewatered substrate to low or hyper-frequency electromagnetic radiation.

Figure 5:
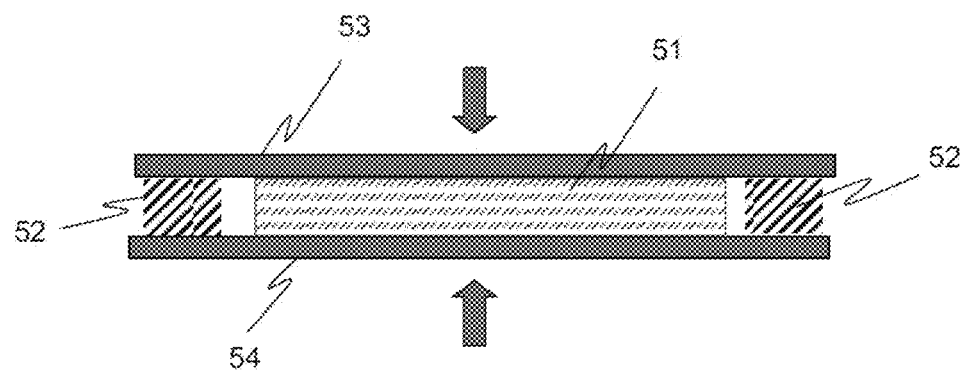
FIGS. 5 and 6, illustrations of application of the expansion step of the method according to the invention.
Figure 6:
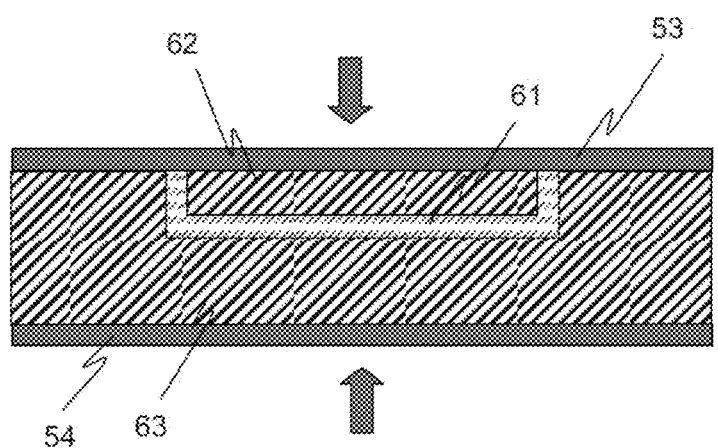

According to a preferred embodiment, shown in FIGS. 5 and 6, this step is carried out by means of a heating press, the temperature of heating preferably being between 130° C. and 180° C., a temperature that permits both activation of the expanding agent and crosslinking of the resin. The heating press advantageously allows application of a counter-pressure limiting the expansion of the material caused by the heating.

Figure 4:
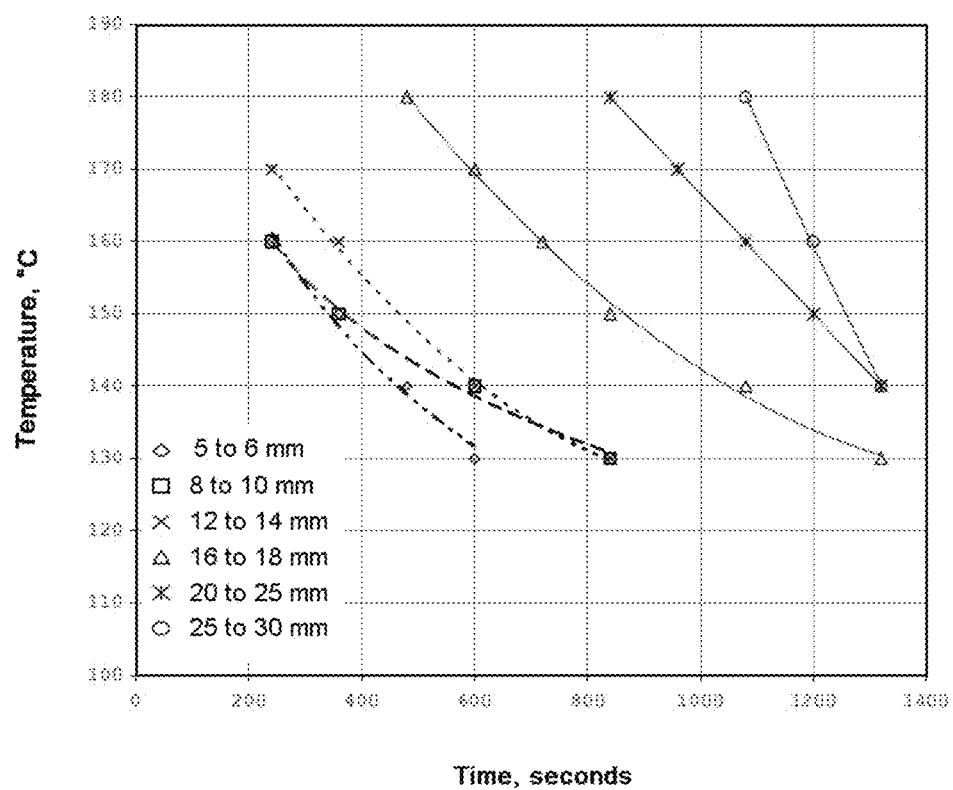
FIG. 4, an illustration relating to selection of the temperature applied to the impregnated and dewatered substrate during the expansion step of the method according to the invention.

In this preferred embodiment, the time in the press is moreover defined, as illustrated by the nomogram in FIG. 4, as a function of the thickness (and therefore of the density) of the material to be produced for the application considered. In this case, the use of a heating press advantageously makes it possible to control the final thickness, after expansion, of the material 18 produced.

According to this preferred embodiment, step 13 of expansion of the composite material according to the invention comprises carrying out the following operations:

preheating the press;

putting in place equipment and means for controlling the thickness as well as the geometry of the element of composite material to be produced. In the case of a flat element 51, a plate, these means for example consist of metal blocks 52 interposed between the top platen 53 and bottom platen 54 of the press, whereas in the case of a component 61 having a given volume these means consist for example, as shown in FIG. 6, of cavities 62 and 63 conforming to the shape of the component, the cavities having served for forming the impregnated substrate for example;

depositing a mold release agent (not shown in FIGS. 6 and 7) on the bottom platen of the press, as well as on the upper face of the impregnated substrate. This mold release agent consists for example of parchment paper;

putting the impregnated substrate on the bottom platen of the press;

applying pressure to the press, the values of pressure to be applied as a function of the thickness that the element is to have after expansion being, for example, recorded beforehand in the operating and control system of the press.

According to the invention, the counter-pressure imposed on the impregnated substrate to limit its expansion to the desired value will thus typically be between 75 and 200 tonnes, for the applications envisaged.

At the end of the expansion phase, it is necessary for a variable amount of volatile elements trapped in the material, and notably water vapor, connected with the use of fibers of natural origin, to be removed from the material. The fourth step 14 of the process for manufacturing a composite material 18 according to the invention relates to proceeding to said removal. This step, the duration of which is notably a function of the thickness of the element of material produced, or of the component produced, is indispensable for maintaining the integrity of said component.

It is preferably employed in the case when the element of composite material produced has a complex geometry, with faces that are not flat, curved faces for example, the production of such an element requiring placing, between the platens of the press, a mold that completely imprisons the element. In the case of a flat element of standard thickness (≤12 mm), the water vapor trapped in the material escapes naturally at the edge of the element, the blocks being prepositioned in order to calibrate the thickness, providing vents sufficient for removal of the volatile elements during the expansion phase.

According to the invention, this step of removal 14 of the water vapor mainly follows the expansion phase 13. It consists of producing a partial decompression which allows the water vapor, initially present within the impregnated substrate, to escape.

Figure 7:
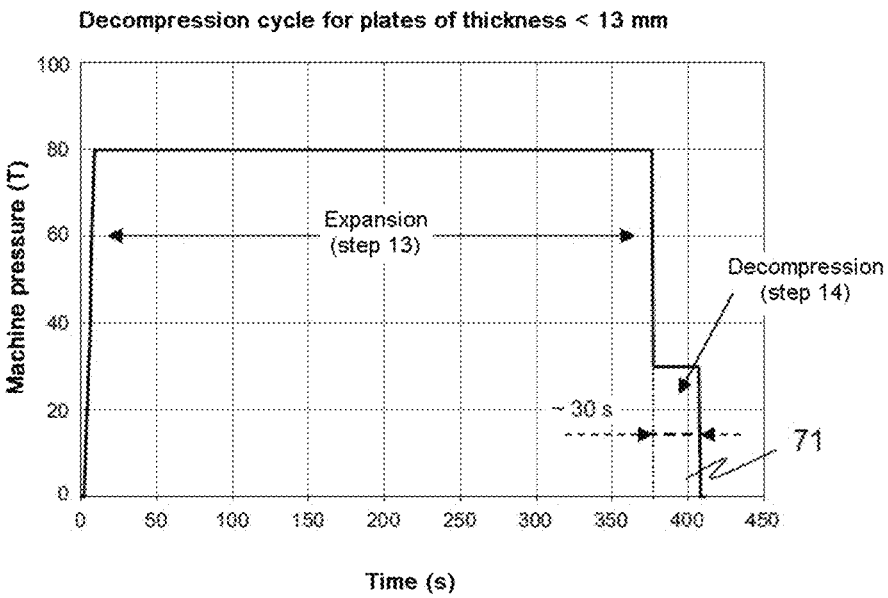
FIGS. 7 and 8, timing diagrams illustrating the principle for the sequence of the steps of expansion of the substrate and of removal of the volatile elements trapped in the substrate, in the case of the manufacture of an element of composite material of small thickness and in the case of the manufacture of an element of composite material of greater thickness.
Figure 8:
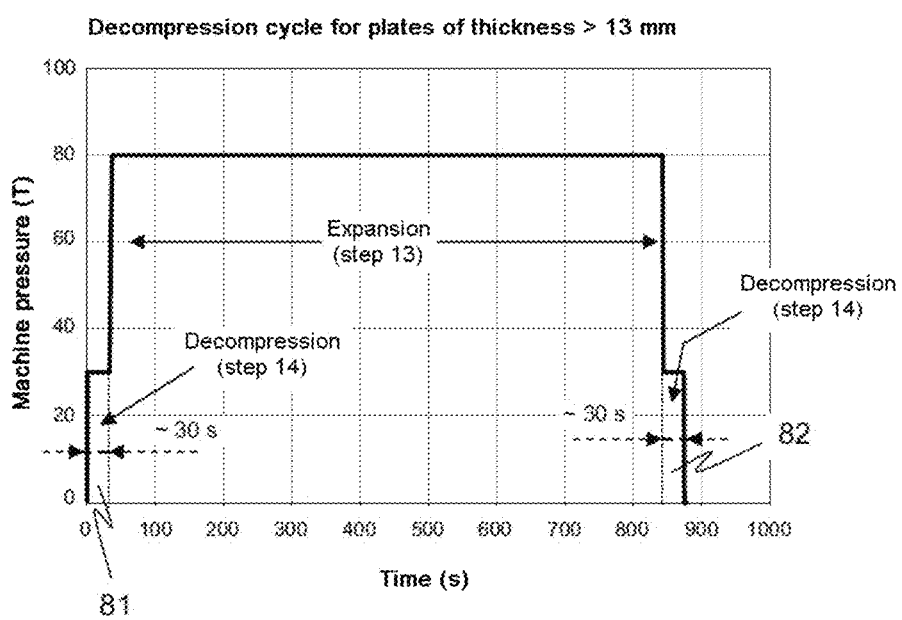
Figure 9:
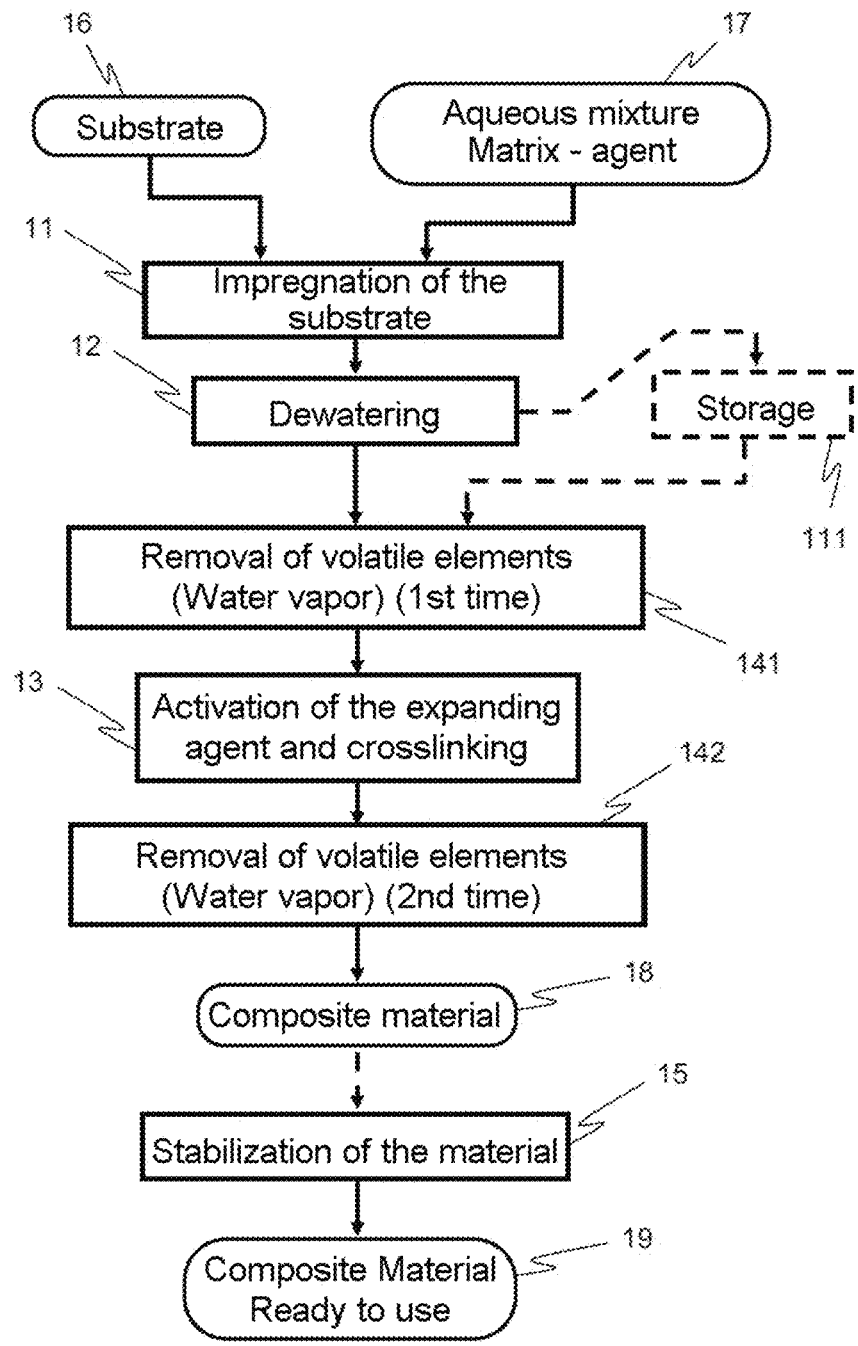
FIG. 9, basic flowchart of a variant of the sequence of steps of the method for manufacturing the composite material according to the invention, applied to the manufacture of a thick element of composite material.

According to a preferred embodiment of the method according to the invention, suitable for manufacturing components of material with a thickness less than or equal to 12 mm, said step, lasting approximately 30 seconds, is carried out just once, after step 13, as shown in FIG. 7 and FIG. 1. However, for thicknesses of material greater than or equal to 13 mm, removal of the water from the impregnated substrate may require carrying out the single step 14 several times, twice for example. In this case, it is carried out a first time 141 before execution of the expansion phase 13 and a second time 142 afterwards, as shown in FIG. 8 and FIG. 9.

Before any use of the material thus obtained at the end of the four manufacturing steps proper, the latter is submitted to a final step 15 of stabilization consisting of leaving the manufactured element of material 18 at rest in a horizontal plane for a sufficient time to return to room temperature naturally. According to a preferred embodiment of this final step, resting of the element of material lasts at least 2 hours. This final step of stabilization notably allows relaxation of the mechanical stresses within the material, and this relaxation guarantees its integrity (i.e. absence of internal defects) as well as maintaining its dimensional characteristics. An element of composite material 19 is then obtained that is ready to be used for producing the desired object or structure.

Moreover, the material according to the invention thus produced can, depending on the use for which it is intended, undergo additional operations such as painting, deposition of a surface coating forming a mechanical reinforcement or endowing the material with certain aesthetic characteristics.

Thus, using the method according to the invention with the ingredients described in the present application, advantageously a composite material is obtained that has characteristics of composition and of structure, as well as physical characteristics (mechanical, thermal and acoustic) of a nature to constitute a solution to the problems mentioned above, problems for which the existing composite materials do not provide a satisfactory solution.

The following practical example is presented for purposes of illustrating the present invention.

This example relates to the production of a composite material with basalt fibers for aeronautical application. This material is designated ROXALTE® by the applicant.

The material is a composite material according to the invention, produced following the steps of the method according to the invention, recalled below:

The material in question is obtained starting from a mixture 17 of resin, expanding agent and water, the whole being mixed mechanically within a vertical mixer of the Lödige type, or on a device of the drum inverting type, for about 20 minutes.

The phenolic resin/expanding agent mixture is in this case prepared in such a way that the proportions of the final mixture are as presented in Table 2 below.

TABLE 2 example of ROXALTE ® formulation for aeronautical application

| Constituent ingredients | Proportion by weight |
|---|---|
| Phenolic resin [Casconol PF1535] | 77% |
| Expancel 642 WU 40 | 15% |
| Water | 8% |

The mixture described above is mixed mechanically in a vertical mixer of the Lödige type for 10 minutes (time for attaining homogeneity of the mixture).

The above mixture is used for carrying out impregnation 11 by gravity and calendering of a felt 16 whose weight is 780 g/m², said felt being distributed commercially by the company Basaltex under reference 6/130 from the range BCF Fibers Needlefelts/Mats, the required reinforcement/resin final weight ratio, adjusted by calendering, being 30/70.

After impregnation with the phenolic resin, the felt 11 undergoes a step 12 of dewatering for 24 hours, which follows the thermal cycle presented in FIG. 3.

Finally, the expansion step 13 is in this case carried out by means of a press with a machine pressure of 80 tonnes.

A sample of the ROXALTE® material thus manufactured, the characteristics of which are recalled below, was then characterized in fire resistance tests. The results of these tests, analyzed according to the standards FAA AC20-135 and ISO 2685 (1998 edition), allow us to state that the ROXALTE® material was resistant to fire or "fireproof".

Dimensions of test plates: 10×10 inches
Thicknesses tested: 7 and 14 mm
Density of the material: 150 and 300 kg/m³
Fire resistance >17 minutes.

The invention claimed is:

1. A composite material (18), comprising:
    a substrate of natural fiber having the structure of a felt, said felt being needle-punched on its two faces by supplying an additional polyethylene fiber;
    a thermosetting matrix formed from a water-based resin configured for impregnating the substrate completely;
    an expanding agent dispersed in the matrix, expansion of which is initiated by heating it to a given temperature, the expanding agent forming, with the thermosetting matrix, an aqueous mixture integrated with the substrate by impregnation;
    the proportions by weight of substrate and of thermosetting matrix used being defined so as to obtain an impregnated substrate having the following proportions by weight after drying:
        between 60% and 80% of fibers,
        between 40% and 20% of resin;
    the proportion by weight of expanding agent in the aqueous mixture being between 10% and 15%.

2. The material as claimed in claim 1, wherein the substrate is a felt of basalt fibers.

3. The material as claimed in claim 2, wherein the basalt constituting the fibers forming the substrate contains a proportion of olivine at least equal to 15 wt %.

4. The material as claimed in claim 1, wherein the resin constituting the matrix is a phenol-formaldehyde resin.

5. The material as claimed in claim 4, wherein the resin constituting the matrix is obtained from a bio-source.

6. The material as claimed in claim 1, wherein the expanding agent is formed from microspheres of hydrocarbons coated with a polymer film.

7. The material as claimed in claim 6, wherein the hydrocarbon of the expanding agent is isobutane.

8. The material as claimed in claim 1, wherein the expanding agent is a yeast mixed in the water-based resin.

9. The material as claimed in claim 1, further comprising a substrate of fiber and a thermosetting matrix (aqueous base) in the following proportions by weight:
    fibers: 30%,
    matrix: 70%.

10. The material as claimed in claim 1, further comprising a substrate of fiber and a thermosetting matrix (aqueous base) in the following proportions by weight:
    fibers: 40%,
    matrix: 60%.

11. The material as claimed in claim 1, further comprising an antibacterial agent immersed in the matrix.

12. The material as claimed in claim 1, further comprising at least one colorant immersed in the matrix.

* * * * *